(12) United States Patent
Knauerhase et al.

(10) Patent No.: US 7,631,089 B2
(45) Date of Patent: Dec. 8, 2009

(54) SYSTEM FOR DEVICE-ACCESS POLICY ENFORCEMENT

(75) Inventors: Robert C. Knauerhase, Portland, OR (US); Scott H. Robinson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1096 days.

(21) Appl. No.: 10/335,091

(22) Filed: Dec. 31, 2002

(65) Prior Publication Data

US 2004/0128394 A1    Jul. 1, 2004

(51) Int. Cl.
*G06F 15/16* (2006.01)

(52) U.S. Cl. .................. 709/229; 709/203; 709/219; 709/223; 709/224; 709/225; 709/227; 709/232; 709/226

(58) Field of Classification Search ............... 709/203, 709/219, 223, 224, 225, 227, 232, 229; 710/303; 718/1, 104; 320/107; 455/343.1; 726/17, 726/18
See application file for complete search history.

(56) References Cited

U.S. PATENT DOCUMENTS

| 5,742,758 | A | * | 4/1998 | Dunham et al. ............... 726/18 |
| 5,798,951 | A | * | 8/1998 | Cho et al. .................... 710/303 |
| 6,182,141 | B1 | | 1/2001 | Blum et al. |
| 6,185,625 | B1 | | 2/2001 | Tso et al. |
| 6,195,712 | B1 | | 2/2001 | Pawlowski et al. |
| 6,292,833 | B1 | * | 9/2001 | Liao et al. .................... 709/229 |
| 6,421,733 | B1 | | 7/2002 | Tso et al. |
| 6,477,361 | B1 | * | 11/2002 | LaGrotta et al. ......... 455/343.1 |
| 6,792,095 | B1 | * | 9/2004 | Frank ..................... 379/216.01 |
| 6,795,966 | B1 | * | 9/2004 | Lim et al. ...................... 718/1 |
| 7,062,559 | B2 | * | 6/2006 | Yoshimura et al. .......... 709/226 |
| 2003/0025476 | A1 | * | 2/2003 | Trela ............................ 320/107 |
| 2003/0187991 | A1 | * | 10/2003 | Lin et al. ..................... 709/227 |
| 2005/0272445 | A1 | * | 12/2005 | Zellner ..................... 455/456.2 |
| 2006/0031504 | A1 | * | 2/2006 | Hegli et al. ................. 709/225 |

* cited by examiner

*Primary Examiner*—Salad Abdullahi
*Assistant Examiner*—Barbara N Burgess
(74) *Attorney, Agent, or Firm*—Marger Johnson & McCollom, P.C.

(57) ABSTRACT

Embodiments of the invention include an access policy enforcement system for a system that provides services to other devices. As a service-providing device changes environments, or mobile states, access to the device's services is automatically and transparently limited or expanded. One aspect of the access policy determines the particular state in which the service-providing device is operating. Another aspect uses the determined state to dictate which services will be available to other devices.

21 Claims, 9 Drawing Sheets

SYSTEM FOR DEVICE-ACCESS POLICY ENFORCEMENT

TECHNICAL FIELD

This disclosure is directed to limiting access to services provided by a computing device, and, more particularly, to dynamically matching a proper level of access to the number or level of services provided by the computing device, based on the operating environment of the computing device.

BACKGROUND

Computer networks, until recently, have been "wired" networks. Wired networks require some type of physical connection between the computer connecting to the network and an access point to the network to carry the communication signals. The physical connection is commonly a network cable or telephone wire. Although wireless transmission of data for specialized purposes has been possible for some time, such as for transferring data between a computer and a printer using infrared (IR) ports, only recently have wireless computer networks become widespread. One reason for the increased popularity in wireless networks is that the cost to create a wireless network has dropped appreciably from the cost to create one just a few years ago, and this trend is very likely to continue.

Simultaneous with the growing availability of wireless computer networks, capabilities of portable computing devices are increasing. These increased capabilities include not only portable personal computers, e.g. laptop and notebook computers, but are also found in smaller devices, such as handheld computers (e.g. the Palm™ and iPAQ™ personal digital assistants), wireless communication devices like RIM Corporation's Blackberry™, and even in mobile telephones.

Presently, portable computers and other devices, such as those described above, have the capability to provide services formerly provided only by powerful network servers. In other words, many contemporary devices can not only use services of others, such as a laptop computer accessing the Internet through a Wireless Access Point (WAP), but can also provide services to other devices, such as providing access to an authentication program running on a laptop computer that provides authentication services for a trust network.

Protecting devices that are connected to a wireless network from unauthorized access over the wireless network itself is especially difficult, because, unlike a wired network, no physical connection is needed to access a wireless network. Antennae for most popular wireless network frequencies are generally small and easy to conceal. Since no signs of unauthorized access may exist, network providers, and especially wireless network providers, must be extremely diligent to ensure that only those devices authorized to access a network are doing so.

Ways to limit access to devices are known, such as by using a firewall that limits access to a network to only authorized users, as well as by requiring passwords, requiring data encryption, etc. Network firewalls can limit or filter network traffic leaving or entering a device or network of devices. However, not only is the process for correctly configuring such a firewall time consuming and detailed, once a service provider leaves the environment for which access was tailored, the access is most likely not tailored to the new environment. This is a particularly difficult situation for devices that provide services to other devices and that operate in more than one environment. Security for each environment is different, and therefore each environment may require a completely different security configuration for the proper amount of protection. Providing few or no services in environments that the operator cannot completely trust may unnecessarily limit the services provided. Providing many services that are not secure may jeopardize valuable data or the service provider itself.

Embodiments of the invention address this and other limitations of the prior art.

BRIEF DESCRIPTION OF THE DRAWINGS

The invention will be understood more fully from the detailed description given below and from the accompanying drawings of embodiments of the invention, which, however, should not be taken to limit the invention to the specific embodiments, but are to facilitate explanation and understanding.

DETAILED DESCRIPTION

Figure 1:
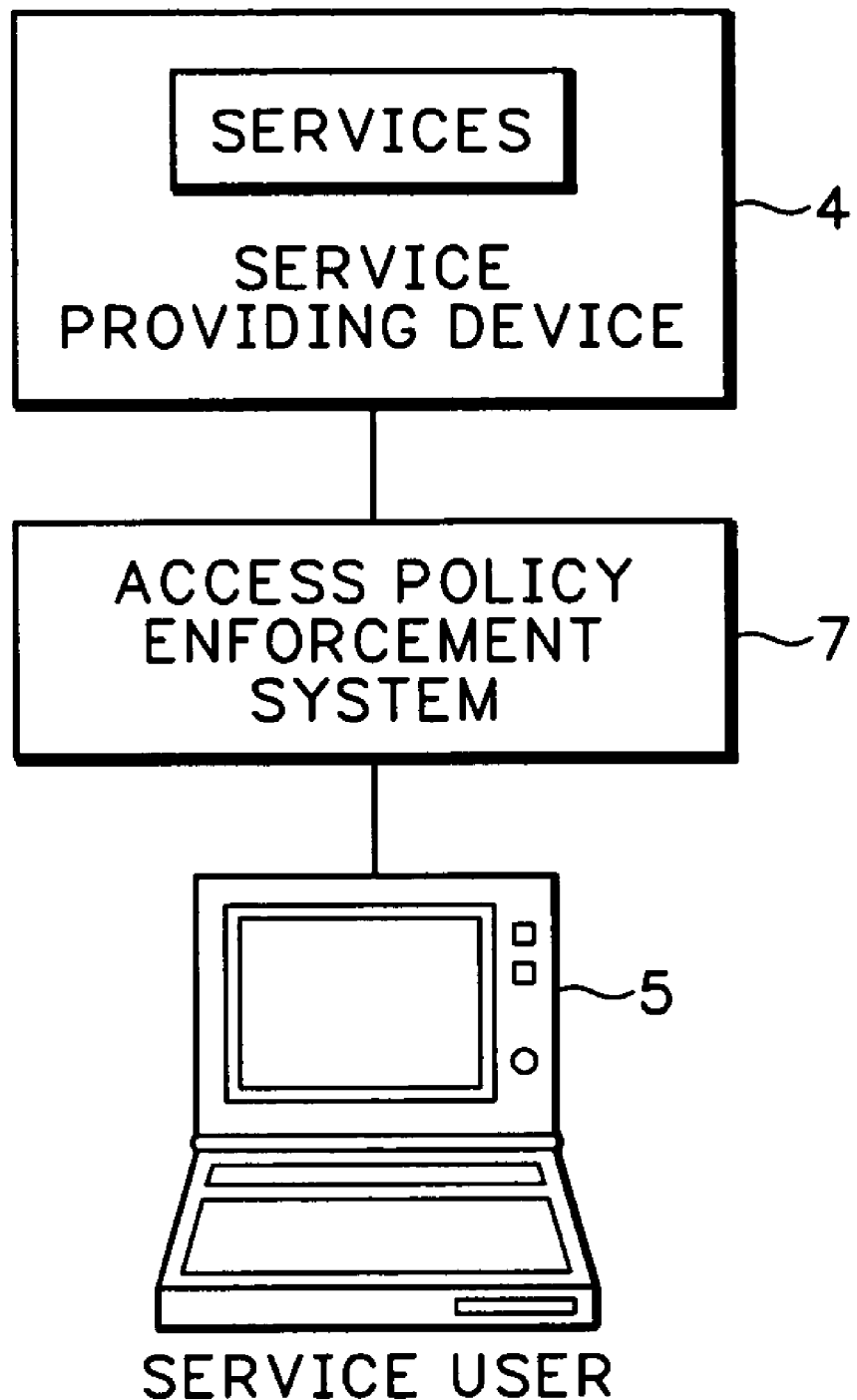
FIG. 1 is a block diagram illustrating an access policy enforcement system according to embodiments of the invention.

Embodiments of the invention include an access policy enforcement system for a system that provides services to a requesting device. FIG. 1 illustrates concepts useful for illustration of explanation embodiments of the invention. In FIG. 1, a service-providing device 4 includes services that may be useful to another device 5, or services that could be used by the service providing device 4 itself. Discussion of the types of services able to be provided appears below. An access policy enforcement system 7 that is linked to (or resident on) the service-providing device 4 determines which services (if any) will be provided by the service-providing device 4. The access policy enforcement system 7 determines the number or extent of the services offered by the service-providing device 4 based on the environment in which the service-providing device 4 is operating. If, for instance, the operating environment is a trusted environment, the access policy enforcement system 7 tends to make more services available. If, instead, the operating environment is unknown or insecure, fewer services may be provided. The access policy enforcement system 7 uses many determinants to control which services will be provided by the service provider 4; trust and security are only two of many factors in the determination.

In the embodiment where a device uses its own services access by the device to its own services may or may not be governed by the access policy enforcement system 7 used in conjunction with the service-providing device 4.

Different types of operating environments can include a wide variety of variables, for example, a type of network connectivity (e.g. wired or wireless), type of network environment (e.g. private/corporate, public Internet), power source (e.g. power grid or battery), amount of power remaining, location, presence or absence of peers, etc. Once the present operating environment is determined, the access policy enforcement system 7 dynamically controls the services or levels of services provided by the service provider 4 to other devices 5 that can use the services.

As the service-providing device 4 changes environments, or "mobile states", the access policy enforcement system 7 senses the state change and determines if the number, level, and/or general or specific types of services being currently provided by the device is appropriate for the present state. If so, no changes are made to the services provided by the service provider 4. If, however, different types, levels, or numbers of services could be appropriately provided by the service provider 4, then those changes are effected so that the appropriate services are then provided. Such environment detection and changes to services is automatic and transparent to the operator of the service-providing device 4.

The access policy enforcement system 7 can be embodied in a number of ways, and the particular method used to modify the level or amount of service provided by the device is not crucial to the workings of the invention. Specifically, the access policy enforcement system 7, or portions thereof, could take form in a software or hardware firewall that is internal or external to the service-providing device 4. The firewall could operate by closing ports through which services were served. Alternatively, the service-providing device 4 could include a service directory, which is a repository of data entries that define what services are available on a device and for whom they are available. Embodied in this form, the access policy enforcement system 7 could base its response from the entries in the service directory, or even add, remove or modify data entries in the service directory as more or fewer services are offered. In one embodiment, the access policy enforcement system 7 may be coupled or integrated with the service directory or service advertisement system, such as the UDDI standard (Universal Description, Discovery, and Integration for Web Services.) Firewalls are well known in the art, and therefore will not be discussed in further detail.

As used in this disclosure "services" is extremely broad, and can include much more, than is typically associated with the word. As used herein, services means any service, function, resource, benefit, or operation, etc., performed for another device. Services can include traditional network services, such as web serving, electronic mail forwarding, authentication, payment processing, etc. Resources can include anything provided by the service-providing device 4, such as hard drive storage space, particular files or objects stored within the device, CPU processing cycles that can be used by another device for file transcoding or any other use, connection to another network, network bandwidth provided to another machine, etc. Functions could include access to particular programs or processes on the service-providing machine, such as pass through searching, v-card exchanges, and other capabilities by the service-providing machine. Those skilled in the art will recognize that the examples listed above are only representative and many, many more types of "services" are available to be provided by a service-providing machine, all of which are encompassed in embodiments of the invention. Web Service standards, including standards such as XML (eXtensible Markup Language), SOAP (Simple Object Access Protocol), WSDL (Web Service Description Language), UDDI (Universal Description, Discovery, and Integration), are one set of standards and protocols for defining such services. Microsoft® NET provides an implementation environment for defining such programmatic services. Or, for example, the Global Grid Forum's Globus project may soon offer resources as network-available services.

In addition to particular services offered by a device, the breadth of services offered can also be restricted by the access policy enforcement system 7. For instance, mail forwarding may be available only to those service-using machines 5 that have been authenticated to the service-providing device 4. Thus, merely because the service-providing device 4 is capable of providing particular services does not mean that those services are available to all other devices.

FIGS. 2-5 show illustrative computing environments helpful in explaining operation of the access policy enforcement system 7. A given service-providing device 10 may maintain multiple network connections simultaneously. For example, it may be connected to a private wired network as well as a public wireless network. In one embodiment, zero or more network connections are governed by separate access policy enforcement system(s) 7, and zero or more network connections are governed by a single, shared access policy enforcement system 7. An access policy enforcement system 7 can, but need not, share information and state with other access policy systems 7.

Figure 2:
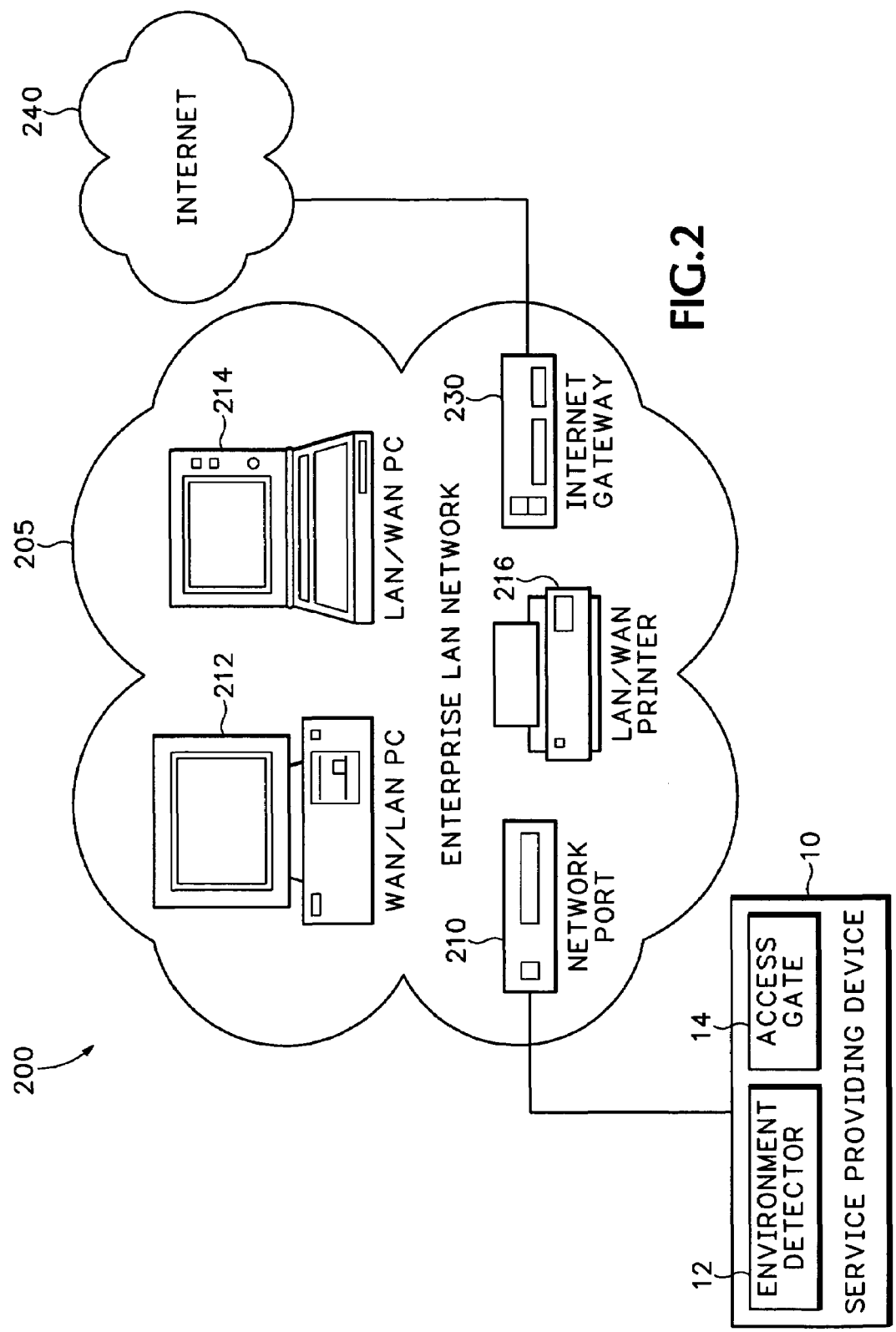
FIG. 2 is a network diagram showing a computing environment in which embodiments of the invention may operate.

Illustrated in FIG. 2 is a first computing environment 200. A component of the computing environment 200 is an enterprise LAN (Local Area Network) network 205, such as an Ethernet network or a distributed network that includes many different types of networks. The mobile service-providing device 10 couples to the LAN 205 through a network port 210. The LAN 205 can include many components, only some of which are illustrated here. For example, the LAN 205 may have a number of LAN PC's 212 and portable computers 214 connected to it. Each of the connected devices can print to a shared printer 216. Additionally, the LAN 205 may include an internet gateway 230, which couples the LAN 205 to the Internet 240.

Portions of the access policy enforcement system 7 are illustrated as being within the service-providing device 10. Specifically illustrated are an environment detector 12, which determines the particular environment in which the service provider is operating, and an access gate 14, which, when directed, limits the type, level, and/or breadth of services offered by the mobile service-providing device 10. As described below, the access policy enforcement system 7 may include fewer or more components than those illustrated in FIG. 2.

In such a trusted environment as a wired link to a known LAN, the access gate 14 may offer completely any and all services that the service-providing device 10 is capable of performing, without limitation. If, for example, the access gate 14 includes a firewall, the firewall can be commanded to open all ports over which particular services are provided. Alternatively, if the access gate uses a service directory, all services within the directory could be offered.

It is important to note that a service-providing device 10 can also use another device's services. For example, in FIG. 2, the service-providing device 10 may wish to use services available from the LAN PC 212. Correspondingly, the LAN PC 212 may wish to use services available from the service-providing device 10. In this instance, both devices 10, 212 are "service-providing devices", and both devices 10, 212 could include their own access policy enforcement system 7 that regulates the services provided by each individual device.

The access policy enforcement systems 7 of two service-providing devices may communicate with one another to determine further capabilities and operational features. Communication exchanges can include, for instance, the exchange of cryptographic keys and authentication as well as other communication data. These communications may result in new operational modes such as secure, encrypted communication or network connectivity (e.g. virtual private network) or proprietary access policy enforcement systems. These kinds of operation, for example, would permit two devices to prove to one another they belong to the same corporation and to communicate and exchange services over a public wireless network in a hotel or airport in a secure manner. Services provided to other devices on the network, however, would operate under other policy criteria. Thus, the access policy enforcement system 7 is capable of dynamically adapting its behavior to specific client devices or services, not just classes of networks.

Figure 3:
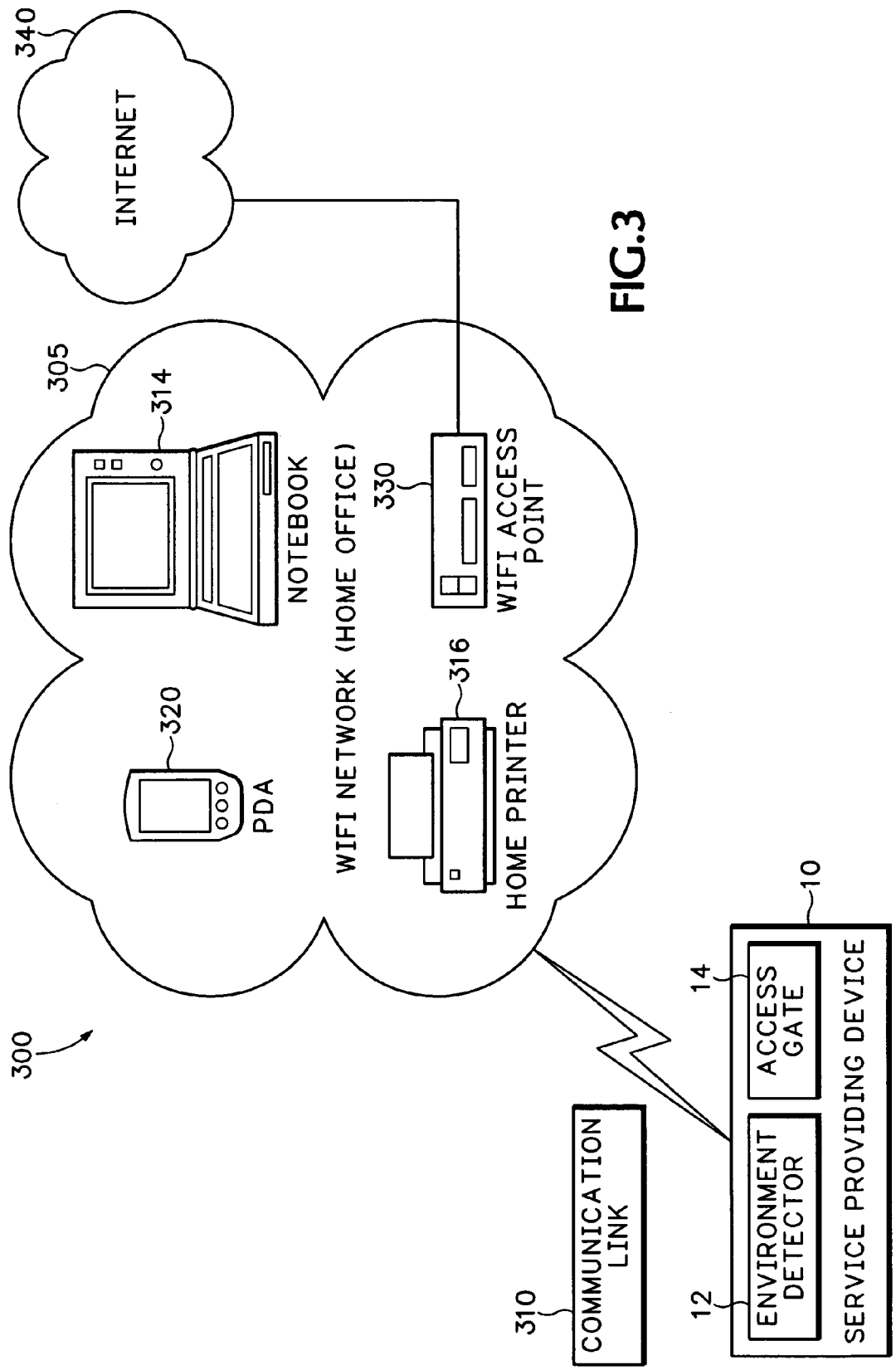
FIG. 3 is a network diagram showing another computing environment in which embodiments of the invention may operate.

FIG. 3 illustrates a second operating environment 300 of the mobile service-providing device 10. In FIG. 3, the service-providing device 10 is connected to a wireless network 305 (for example a WiFi (802.11b Wireless Frequency) network in the home or office) over a wireless communication link 310. Similar to the LAN 200 in FIG. 2, the wireless network 305 includes a notebook 314 and a network printer 316. Additionally included in the wireless network 305 is a PDA (Personal Digital Assistant) 320. The PDA could be any type of device that is capable of communicating over the wireless network 305, and is not limited to being a Palm™ handheld, or the like. The wireless network 305 includes a WIFI access point 330, which couples the wireless network to the Internet 340.

The wireless network 305 is a less secure network than the LAN 200 of FIG. 2, and this state can be detected or determined by the environment detector 12. The device access policy enforcement system 7 automatically uses this information when deciding which services to allow the service-providing device 10 to provide. For instance, there may be sensitive files on the service-providing device 10, so the access gate 14 disallows any access to those files from any device other than the device 10 itself. Or, the access gate 14 may disallow most incoming connections to the service-providing device 10, but still allow some well-known applications to function on the service provider 10.

It is instructive to distinguish between services available for use by another device and services offered for use by a service-providing device 10. Although related, there may be overlap or underlap in either of these two groups. Services may be "available" from a service-providing device 10 that, because of conditions or concerns, no one is authorized to use. One simple case is that services available for use are advertised by the service-providing device 10 and those that are not available are not advertised. However, there is not a clear distinction in all cases because some services may be available for use by some devices, but not by others.

Figure 4:
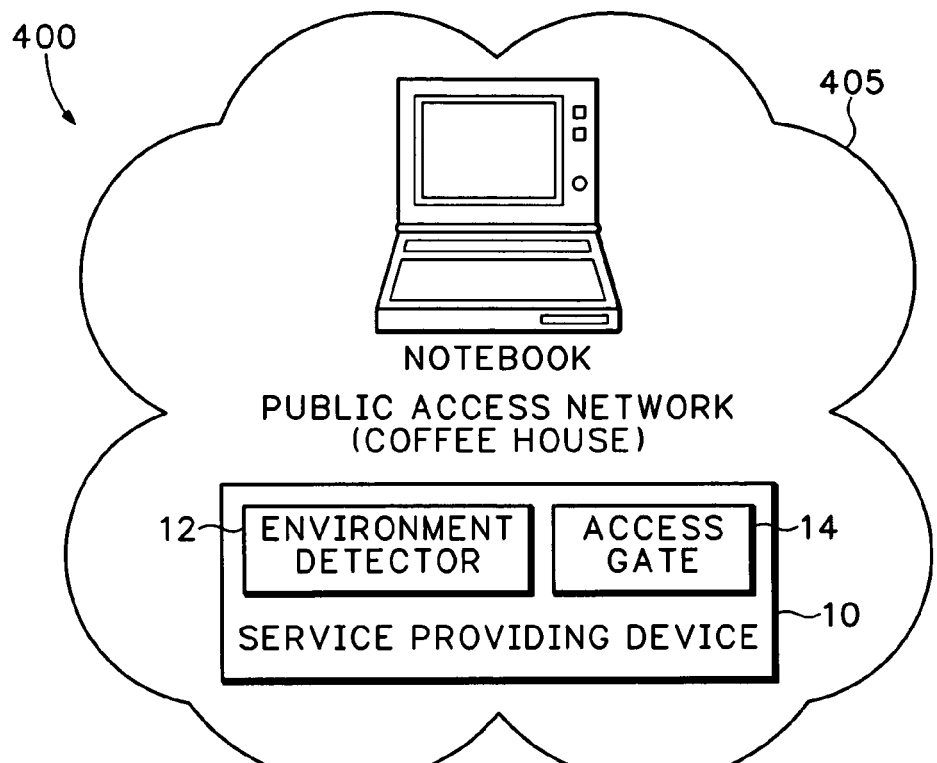
FIG. 4 is a network diagram showing still another computing environment in which embodiments of the invention may operate.

FIG. 4 shows yet another environment 400 in which the service-providing device 10 can operate. In this figure, the service-providing device 10 is coupled to a public access network 405, such as may be available in a coffee house or in an airport, for example. In this environment, the access gate 14 may tighten the services provided to other machines to their most restrictive level. This could mean that absolutely no services are provided to anyone from the service-providing device 10.

Figure 5:
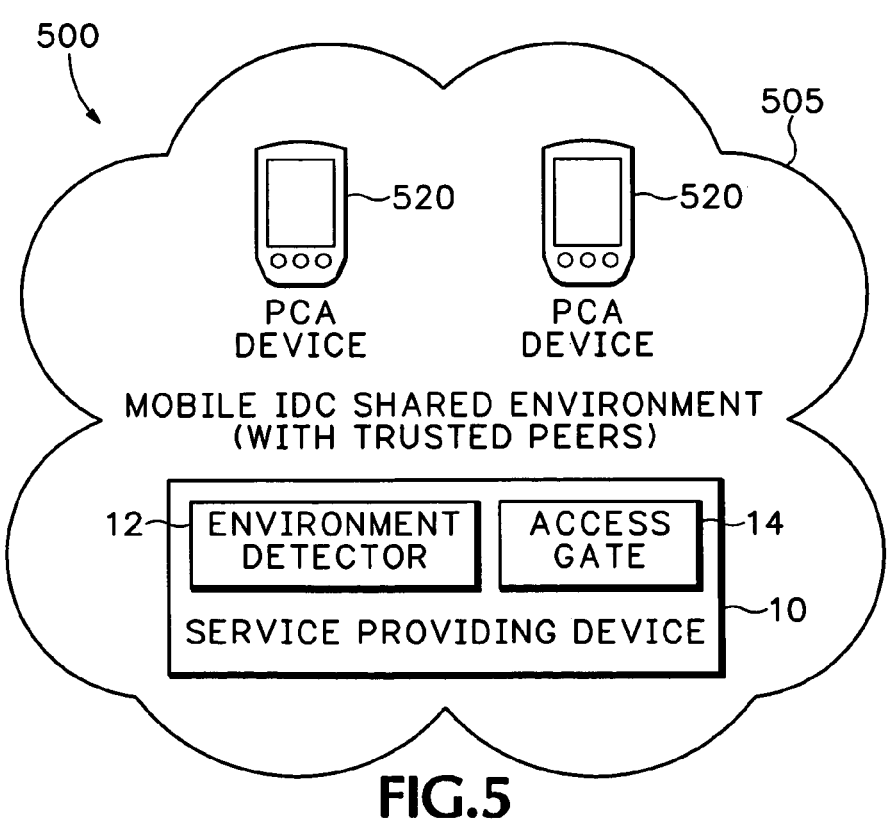
FIG. 5 is a network diagram showing yet another computing environment in which embodiments of the invention may operate.

FIG. 5 shows an environment 500 which could be a mobile shared environment 505 having trusted peers. In this figure, the trusted peers are PCA (Personal Client Architecture) devices 520 that communicate with the service-providing device 10 over a wireless link. In this shared environment 505, the access gate 14 relaxes restrictions and allows services to be provided to those peer devices.

Although the above figures described the service-providing device 10 as a "mobile" device, embodiments of the invention are equally useful with service-providing devices 10 that are stationary. In these embodiments, instead of the service-providing device 10 moving from one environment to another, different environments occur due to other factors. These different environments can be sensed or determined by the environment detector 12. For example, one factor that can be used to determine which services will be offered by the service-providing device 10 is whether the service provider has enough power to do so. For instance, in the case where the power supply discharges from 100% power to a lower power level, for example, of 15% of capacity, the environment detector 12 notifies the access gate 14. Because of the reduced amount of power available to it, the service provider 10 has effectively changed environments. After receiving this information, the access gate 14 may reduce the number or amount of services offered by the service provider 10, especially such as those services that are power intensive. Similarly, the service-providing device 10 may be stationary, while mobile devices are brought in proximity to it, which, as described above, changes the environment in which the service provider is operating. For instance, if the service-providing device 10 recognized the mobile devices, or knew them to be authorized, the full amount of services could be offered to those devices. However, if the service-providing device 10 did not recognize the mobile devices, then the access gate 14 could limit the amount of services provided by the service provider until the mobile devices leave its vicinity.

Figure 6:
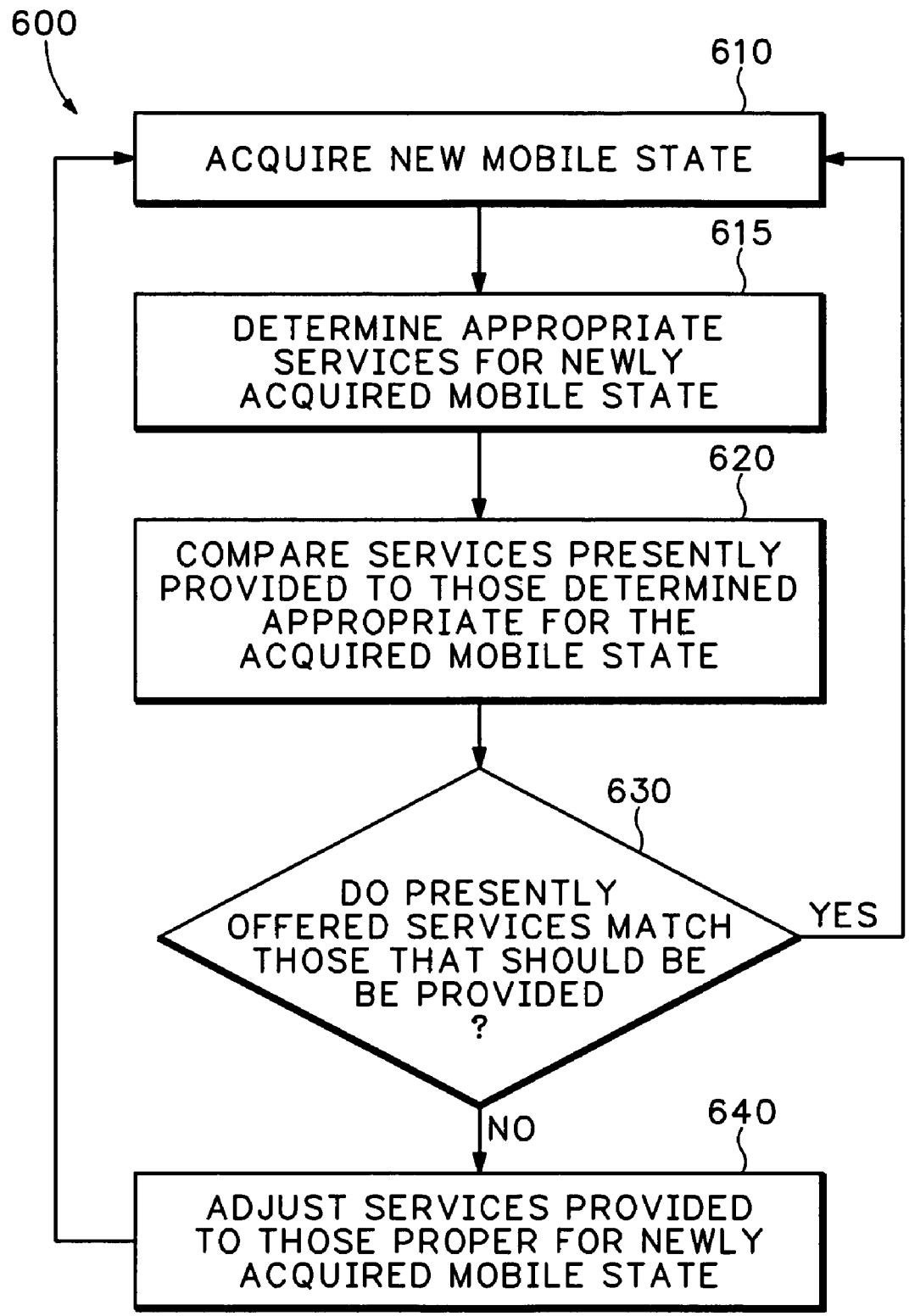
FIG. 6 is an example flow diagram showing processes that can be performed on embodiments of the invention.

FIG. 6 is an example flow diagram used to illustrate processes that can be performed by the access policy enforcement system 7 according to embodiments of the invention. Specifically, a flow 600 determines if a service-providing device 10 must adjust the services presently being provided by the device 10. When the flow 600 begins, the service-providing device 10 is already providing services for a particular mobile state. A process 610 acquires a new present operating environment, or mobile state, in which the service-providing device 10 is operating. As described above, the environment detector 12 operating on the service-providing device 10 can perform this function. Details of acquiring a present mobile state are discussed below with reference to FIG. 7. All factors internal and external to the service-providing device 10 that could have an impact on the number or level of services provided by the service-providing device 10 are detected in the process 610.

In a process 615, the flow 600 determines which services are appropriate to offer for the acquired mobile state. This process can be performed by, for instance, developing a subset from a set of all possible services able to be provided by a service-providing device 10. In some embodiments, the subsets for all of the possible mobile states are already predetermined and stored. In these embodiments, the process 615 is performed by retrieving the pre-stored subsets. In other embodiments, the subset appropriate for the acquired mobile state is calculated or determined after the mobile state is acquired in the process 610.

A process 620 compares the services presently offered by the service-providing device 10 to those determined in the process 615. This can be performed, for example, by comparing the services determined in the process 615 to those presently being offered by the access gate 14 of the service providing device 10. A process 630 then determines if the services presently offered match those that should be offered, given the newly acquired mobile state of the service-providing device 10. If they do match, the flow 600 leaves the process 630 in the YES direction, and returns to the process 610 to acquire a new mobile state. While the service-providing device 10 is not changing mobile states, the flow 600 simply loops through the processes 610, 615, 620, and 630.

If, however, the number or level of services provided by the service-providing device 10 do not match those that should be offered based on the present mobile state, the flow 600 leaves the process 630 in the NO direction. Then, a process 640 instructs the access gate 14 of the service-providing device 10 the proper level of services to offer from the service-providing device 10, and the access gate 14 adjusts those services to match those appropriate for the present mobile state. In one embodiment, a program or other process running on the service-providing device 10 checks the above-referenced database to determine which number or level of services should be offered, and then forwards an indication of that information to the access gate 14, which makes the appropriate changes. Once complete with the process 640, the flow 600 returns to acquire a new mobile state in the process 610.

Figure 7:
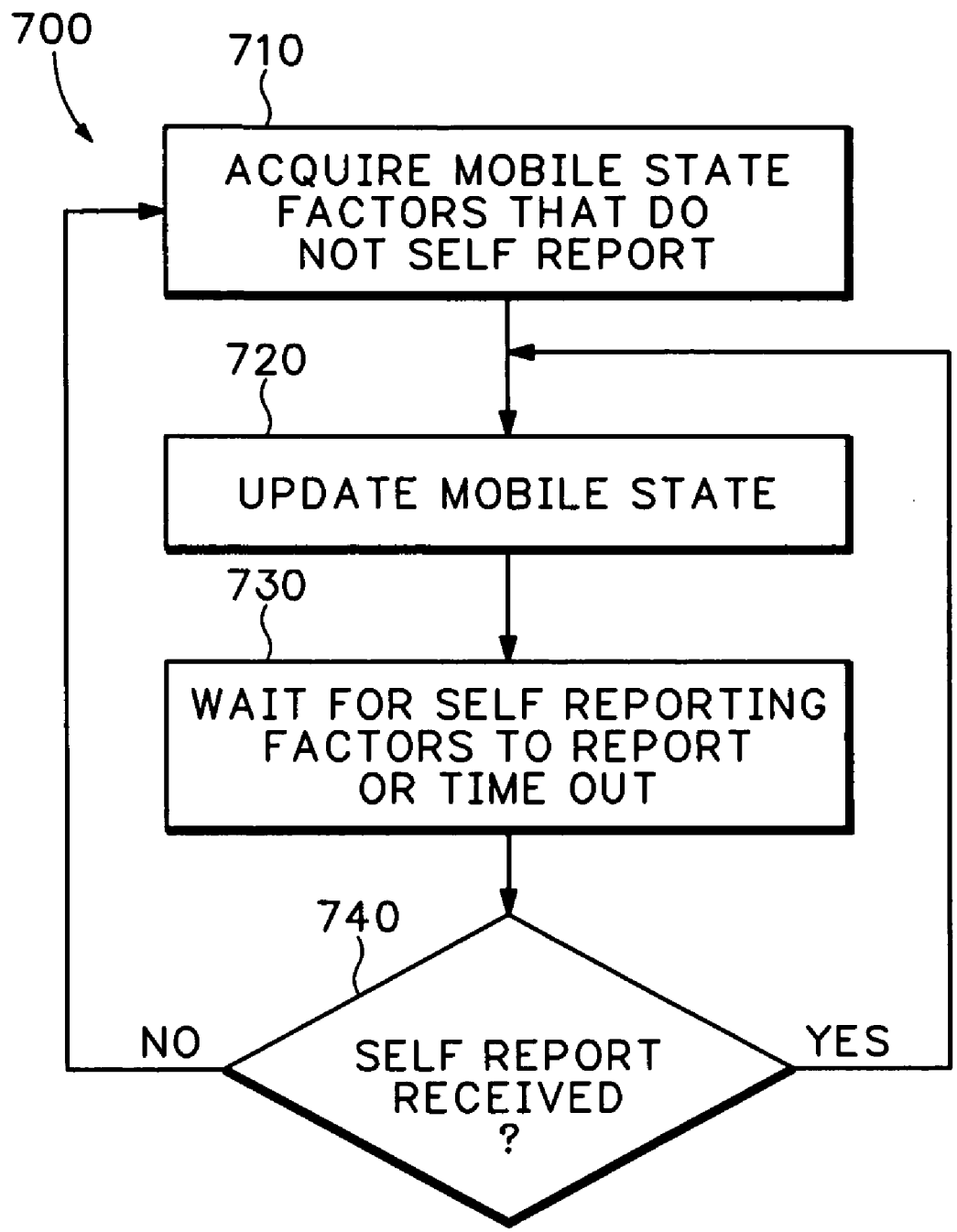
FIG. 7 is an example flow diagram showing processes that can be performed on embodiments of the invention.

FIG. 7 is an example flow diagram that illustrates one way to acquire the present mobile state of the service-providing device 10, according to embodiments of the invention. A flow 700 begins in a process 710, in which factors (or contexts) used to determine the mobile state are acquired for those factors that do not self-report. Most likely these factors are gathered by the environment detector 12 of the service-providing device 10, but could occur in other portions of the service provider as well. In this embodiment, factors are divided into those that self-report, such as by generating an interrupt, and those that do not. In the process 710, the flow 700 acquires the factors that do not self report. Such a process could be implemented by polling devices for information, or by examining data files or registers to extract the information. Thus reporting can be done via synchronous or asynchronous updates. Updates to the mobile state may or may not have an effect on the services listed for use by other device(s). Update parameters or fields or factors may have associated priorities or threshold values that, in turn, may trigger service listing updates.

The number of different factors acquired in the process 710 that are used to determine the mobile state can extend to almost every facet of the service-providing device 10. For example, one factor that is important to determine the present mobile state is how the service-providing device 10 is coupled to networks, such as wireless Ethernet or the Internet, and at what speed data transfer occurs through the networks. For instance, the service-providing device 10 may be a wired connection to a 100 Mbps LAN that has an Internet connection at 1 Mbps. Or, the connection may be on a slow wireless network, with or without additional access to the Internet. These factors are important in determining which services to provide. If the service-providing device 10 is not coupled to the Internet, for example, then the service-providing device 10 would not provide any services that required use of the Internet. Likewise, if the service-providing device 10 is a portable telephone that is operating on a very slow or costly cellular data network, then the service provider would prohibit large data transfers.

Many other factors about the environment in which the service-providing device 10 is operating are gathered in the process 710. For instance, the location of the network itself may be important, and could include, for example, whether the service-providing device 10 is in a trusted business, at the device operator's home (where the trust level would be fairly high), at another's home (where the trust level would be lower), or in a public facility like a coffee shop (where the trust level is minimal). Additionally, the level of network security may be an important factor. If, for example, the service-providing device 10 is connected to a Virtual Private Network (VPN), then the service provider 10 may be willing to provide access to more services, because users of those services have been authenticated.

Still other factors that are gathered include a level of trust, in that known or trusted devices would be granted access to a higher level or more services than those who are not trusted. Also, credentials of the device seeking service, permissions, and access controls are all important factors to consider when determining the particular mobile state.

Some factors are dependent on a machine state of the service-providing device 10. For instance, an amount of disk space remaining on the service provider could dictate that the service-providing device 10 would no longer provide file-storage services. Other machine variables, such as CPU processor load, future scheduled programs, particular software and protocol versions, and version compatibility can all be important factors to determine the present mobile state. Other groups of factors include operator policies, or those dictated by the network owner to which the service-providing device 10 is connected, or by the owner of service provider itself.

Once these factors have been gathered, the environment detector 12 determines a present mobile state in a process 720, and forwards that state to the access gate 14. As can be imagined, because each individual factor determined in the process 710 can affect the mobile state, there may be a large number of mobile states, each of which may affect which services are provided by the service-providing device 10. In determining the present mobile state, in one embodiment of the invention, the environment detector 12 calculates a mobile state based on the received mobile state factors. In another embodiment, the environment detector 12 compares the received mobile state factors to a table or database that classifies the proper mobile state based on the received factors.

In a process 730, the flow 700 waits for any of the self-reporting mobile state factors to report their present state, or waits for a timeout period, which ever occurs first. For instance, these type of factors could interrupt present processes to inform the environment detector 12 of their present state when unusual events occur, such as a battery reaching a low power level. Other factors could periodically self report. Almost any of the factors that can be used by the environment detector 12 could either be self-reporting, or non-self-reporting, and this determination is likely implementation specific.

If a self-report is received in the process 730, the process 740 exits in the YES direction and the flow 700 loops back to the process 720, where the environment detector 12 updates the mobile state. If no self-report is received in the process 730, then the timeout has occurred. In this case, the process 740 exits in the NO direction, and the flow 700 loops back to process 710, where new mobile state factors are gathered. Executing a timeout in this way allows the period for checking for new environment factors to be specifically tailored for the particular service-providing device 10. For instance, a timeout may occur only once every minute for relatively static machines. Or the timeout period may be much shorter if environments for the particular service-providing device 10 change rapidly. Any time difference between the time any individual factor that makes up the mobile state changes, and the time the mobile state is updated (if necessary) to reflect the changed factor, is a time period in which the services provided by the service-providing device 10 may not exactly match the present mobile state of the service provider. Therefore, the timeout period could be kept to a minimum to reduce any amount of time where the level of services actually offered may not match the level of services that should be being offered. Conversely, shorter time periods may increase the amount of computation or network activity excessively or cause services to be posted and removed in short succession.

Figure 8:
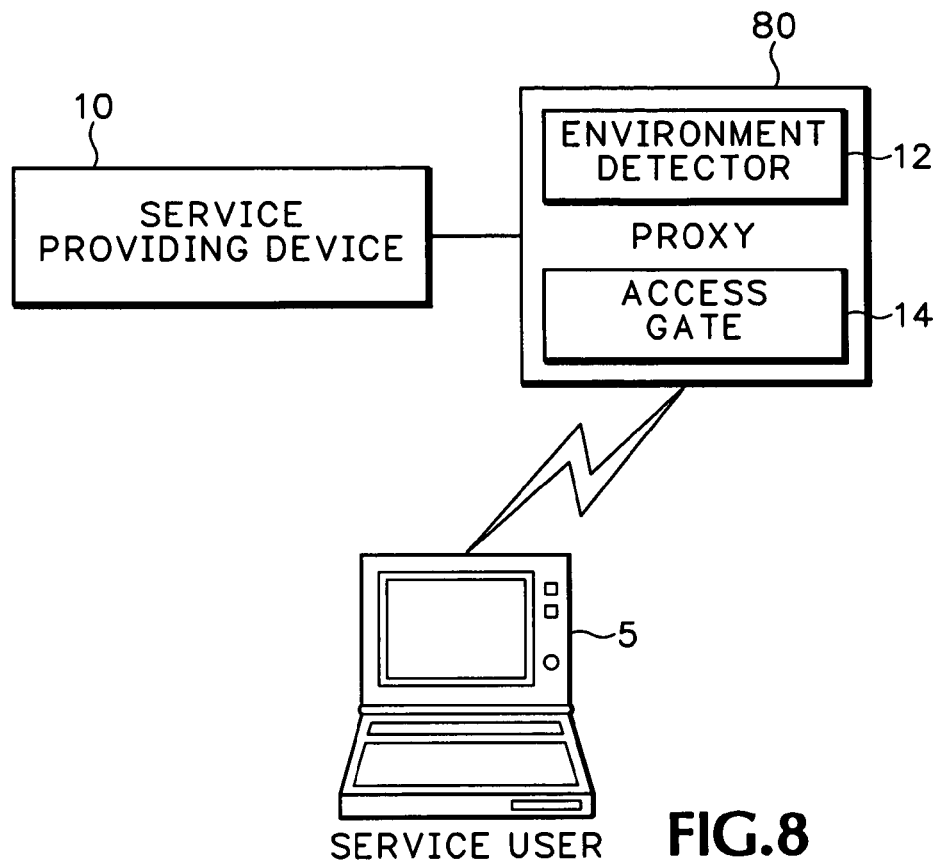
FIG. 8 is a block diagram illustrating an embodiment of the invention using a proxy server.
Figure 9:
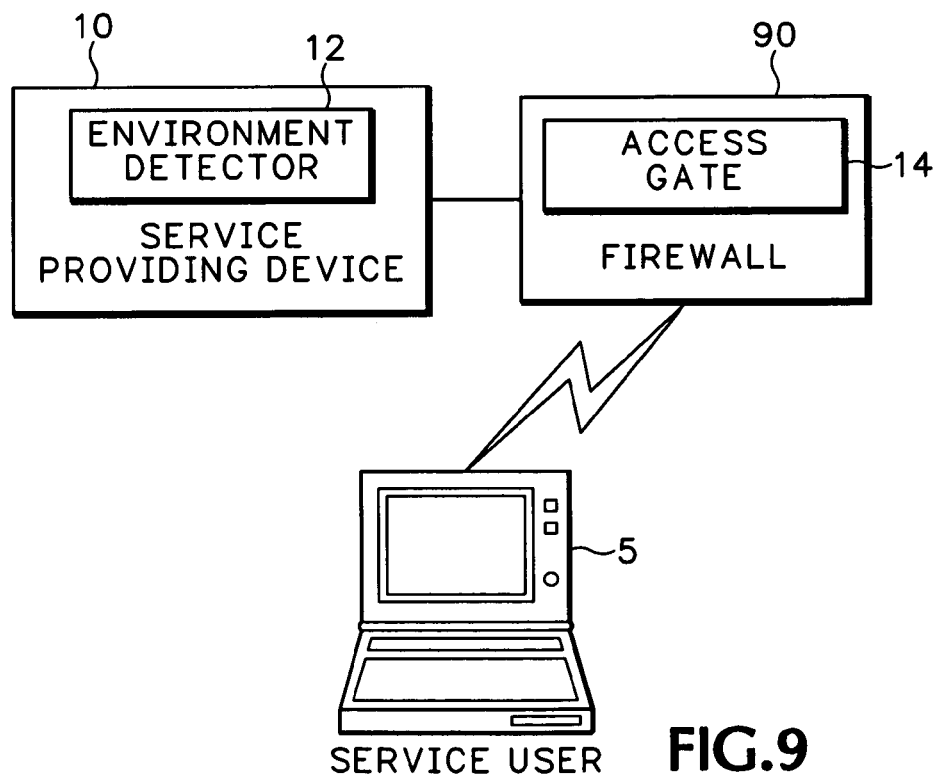
FIG. 9 is a block diagram illustrating an embodiment of the invention using a firewall.
Figure 10:
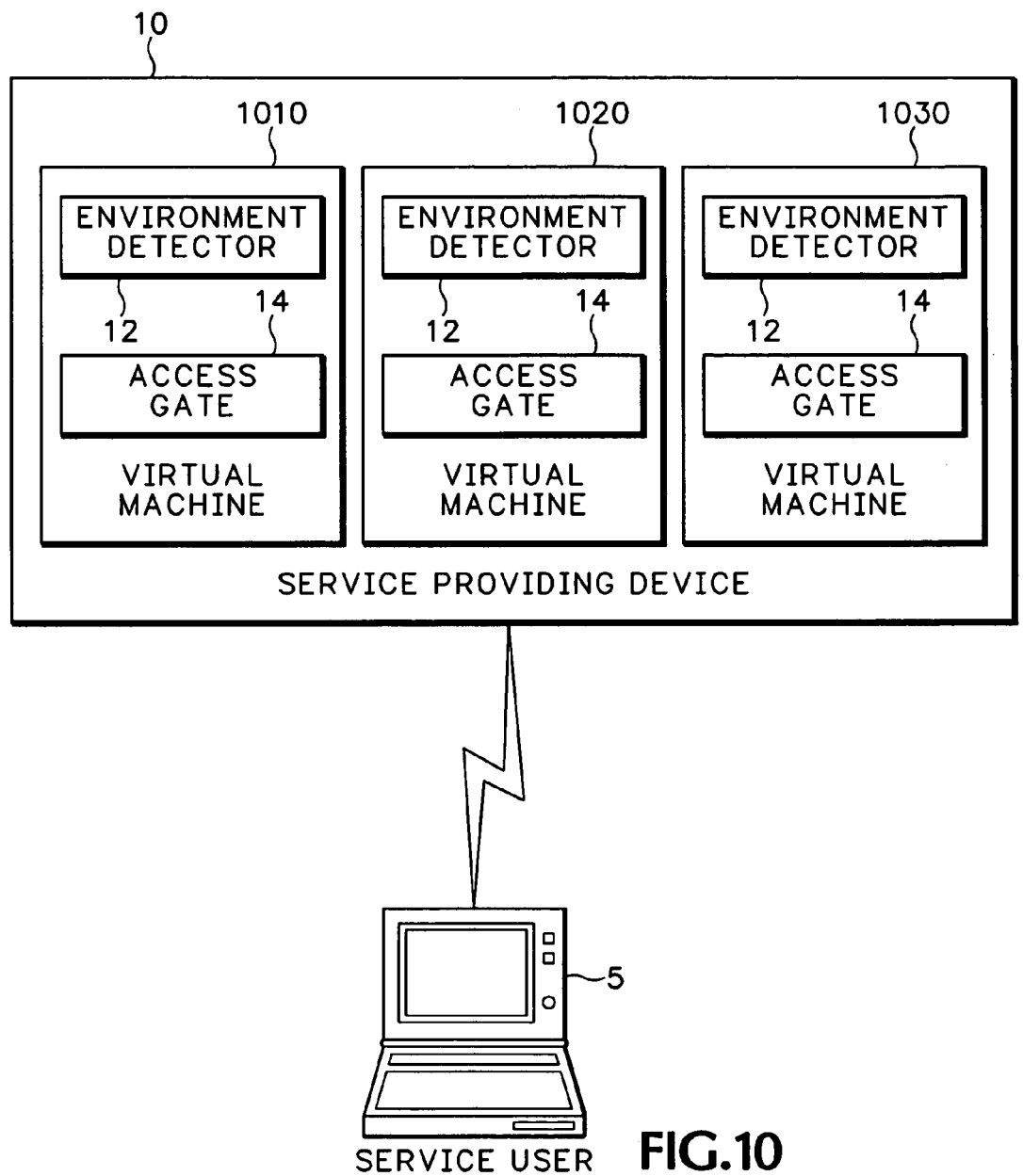
FIG. 10 is a block diagram illustrating an embodiment of the invention using a set of virtual machines.

FIGS. 8-10 illustrate that components of the access policy enforcement system 7 need not be physically or logically located on the same physical device as the service-providing device 10. For instance, as illustrated in FIG. 8, a proxy service provider 80 can be a standalone hardware device or a software process running on the service-providing device 10, for example. A service user 5 couples to the proxy service provider 80 to use services. The proxy service provider 80 doesn't actually provide the desired services, instead the services are delivered by the service-providing device 10. The origin of the services, however, is transparent to the service user 5, and the actual user of the services is transparent to the service-providing device 10. Only the proxy service provider 80 knows the identity of the parties. The use of proxies is well known in the art and implementing components of the access policy enforcement system 7 using a proxy can be understood by those skilled in the art after understanding the teachings of this disclosure.

FIG. 9 illustrates how the access gate can be implemented as a firewall 90. In this embodiment, the access gate 14 can take form of a standalone hardware device, or as a software device running on the service-providing device 10, for example. The firewall 90 limits services provided by the service-providing device 10 by opening or closing well-known "ports." Well-known ports are software ports associated with particular applications and Internet protocols, and are usually (but not always) registered with the Internet Assigned Numbers Authority (IANA). The particular well-known port is open or closed by the access gate 14 to provide or prevent services from being supplied by the service-providing device 10. The use of firewalls is well known in the art, and implementing components of the access policy enforcement system 7 using a firewall may be understood by those skilled in the art after understanding the teachings in this disclosure.

FIG. 10 illustrates how access policy enforcement systems 7 can be associated with virtual machines (VMs) running on a single service-providing device 10. As illustrated in FIG. 10, three VMs, 1010, 1020, 1030, operate on a service-providing device 10. Each VM includes its own access policy enforcement system 7. Although on a single physical device, each VM acts as a separate logical device and can regulate services from the service-providing device 10 independently from the others. For instance, a VM 1010, may have relatively loose standards for providing services to others (a "social" VM), while VM 1020, may have very strict standards (a "business" VM). VM 1030 could have standards in between that of VM 1010 and VM 1020 (a "family" VM). Depending in which environment the service-providing device 10 was operating, a service user 5 would connect to the appropriate VM, and its associated access policy enforcement system 7. Each access policy enforcement system 7 within the different VMs could still be dynamic, in that they could change mobile states relative to their environment, but their access policies can differ, even for the same environment. The use of virtual machines is well known in the art, and implementing components of the access policy enforcement system 7 using VMs can be understood by those skilled in the art after understanding the teachings in this disclosure.

Each virtual machine (VM) might also provide its own services. A similar arrangement might exist as described above, except here the access policy enforcement systems 7 govern access to services provided by that particular VM. In another embodiment, a single access policy enforcement system 7 might be shared by several VMs. Thus, virtual machines (VMs) can be treated herein as just another kind of mobile device and the previous example embodiments listed for physical devices are equally applicable to VMs.

As indicated in the preceding FIGS. 8-10, it is unimportant where components of the access policy enforcement system 7 reside. In FIG. 8, the environment detector 12 and access gate 14 reside on the proxy service provider 80 itself, whereas in FIGS. 1-4, these components reside on the service-providing device 10. In FIG. 9 the access gate resides on the firewall 90, but could also reside in the service-providing device 10. FIG. 10 illustrates that multiple access systems can co-exist on multiple VMs, even within the same physical device, which may or may not be the service-providing device 10.

As mentioned above, some embodiments of the invention can be implemented using directory services over a network. With the advent of large-scale network connectivity, e.g., interconnection between intranets, the Internet, WANs, LANs, etc. (all of which are generally referred to herein as a "network"), it has become increasingly difficult to locate and track networked devices, and to identify services or capabilities that may be offered by the networked devices. To facilitate locating and tracking devices and their services, various "web service" and "directory service" technologies have been implemented.

Somewhat akin to a yellow pages service, a directory service provides an environment allowing a service-providing device 10 to advertise its available services, so that another device may machine search for desired services and arrange to obtain them from the service-providing device 10. The directory service may also optionally contain entries describing services offered by other service-providing devices 10, whose entries are also discoverable when a device searches the directory for services. The term "web services" describes a standardized way of describing, discovering, and integrating network applications, services and resources from different businesses using open standards, such as World Wide Web Consortium (W3C) and Internet Engineering Task Force (IETF) standards, including XML (Extensible Markup Language), SOAP (Simple Object Access Protocol), WSDL (Web Services Description Language), UDDI (Universal Description, Discovery and Integration), etc., over a network, such as the Internet or other network. Web services are self-contained modular applications that communicate directly with other web services, applications, or system software. Thus, for example, XML can be used to tag a web service's data, SOAP used to transfer the data, and WSDL used to describe the web service. UDDI may be used to maintain a list (also herein called database, directory or registry) of, and permit searching for, web services or other services and resources presently available on a network.

UDDI is an industry initiative utilizing a global set of registries to allow businesses to define their services, discover other businesses and services, and to share information about how the business interacts. (See www.uddi.org. As of this writing, the current UDDI specification is Version 3.0, published 19 Jul. 2002.) UDDI is intended to create a platformindependent, open framework for describing services, discovering businesses, and integrating business services. As with web services, UDDI communicates with open standards, including XML, SOAP, HTTP (HyperText Transfer Protocol) and protocols.

Embodiments of the invention may be utilized with various directory service, web services, UDDI registries, Microsoft Corporation's NET services, and the like. It will be appreciated by one skilled in the art, that as times change, alternate registries or services will arise, and that the teachings herein are applicable thereto.

In one embodiment, the device hosting the UDDI server may be pre-designated or predetermined. Such an arrangement might exist in an enterprise environment where the IT (Information Technology) staff designates particular machines as the host(s) for UDDI server(s). In one embodiment, the device hosting the UDDI server may be dynamically elected or appointed using criteria such as trust, security, available resources, owner willingness, etc. This embodiment might be more prevalent in scenarios where spontaneous or ad hoc device networks are formed in which there is not necessarily any available, pre-designated UDDI server. Devices might elect the device with the most available resources as the UDDI server.

In such a case, a local master may communicate with the individual services and their access policy enforcement systems 7, and aggregate their policy settings.

There may be multiple UDDI registries distributed across public and private networks, each storing service registration data. The multiple registries may be kept in sync so that one may register with one UDDI registry and later retrieve registration data from another UDDI registry. Some UDDI servers are globally available. However, there are also uses for UDDI servers on private networks, such as within a given enterprise or even on a specific LAN (Local Area Network) segment or wireless cell area, or within an ad-hoc network. In these cases, multiple UDDI registries may be kept, but their contents are generally not shared with registries outside of that network domain.

Figure 11:
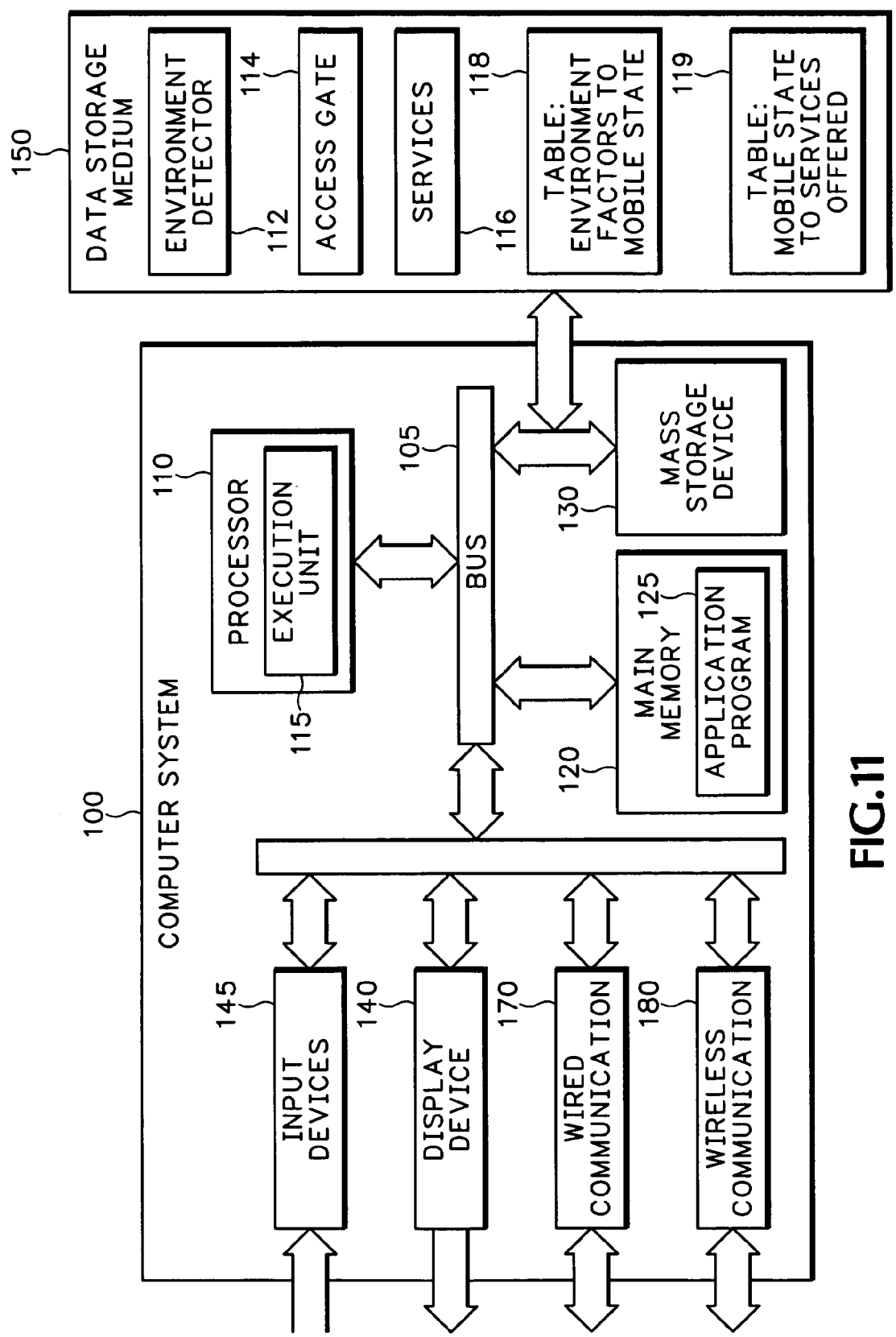
FIG. 11 is a block diagram illustrating components of an example embodiment of an access policy enforcement system.

FIG. 11 is a block diagram illustrating components of an example embodiment of an access policy enforcement system 7 for a service-providing device 10. This embodiment is implemented through a combination of software and hardware on a computing device, such as the service-providing device 10.

One embodiment of the invention is implemented through a set of software modules which may be executed on a computer system such as the computer system 100 illustrated in FIG. 11. The service-providing device 10 can have similar or different components than the computer system 100 without departing from the scope of the invention. In general, a computer system that can implement this embodiment is illustrated by FIG. 11 and includes a bus 105 for communicating information, a processor 110 including an execution unit 115 coupled to the bus 105 for processing information, a main memory 120 coupled to the bus 105 for storing information and instructions for the processor. For example, the main memory 120 may store an application program 125 which may be transferred to the main memory 120 from another memory such as a mass storage device 130 also coupled to the bus 105. The computer system 100 also includes a display device 140 coupled to the bus 105 for displaying information to the computer system user, and an input device or devices 145 coupled to the bus 105 for communicating information and command selections to the processor 110.

Also coupled to the bus 105 are a wired communication module 170, such as a network interface card, and a wireless communication module 180. Communication signals generated by the processor 110 or elsewhere in the computer system 100 are delivered to one of the communication modules for transmission to a receiver capable of interpreting the signals. Similarly, devices wishing to communicate with the computer system 100 send communication signals to either the wired communication module 170 or the wireless communication module 180. These signals are decoded and sent along the bus 105 to the processor 110 or other device in the computer 100 for processing.

The mass storage device 130 is coupled to the bus 105 for storing information and instructions for use by the processor 110. A data storage medium 150 containing digital information is configured to operate with the mass storage device 130 to allow the processor 110 access to the digital information on the data storage medium 150 via the bus 105. The mass storage device 130 may be a conventional hard disk drive, floppy disk drive, compact disc read only memory (CD ROM) drive, digital versatile disk (DVD) drive or other magnetic or optical data storage device for reading and writing information stored on the data storage medium 150 which may be a hard disk, a floppy disk, a CD ROM, DVD, a magnetic tape, or other magnetic or optical data storage medium. The data storage medium 150 is capable of storing sequences of instructions that cause the computer system 100 to perform specific functions.

An access policy enforcement system 7, and the components thereof, may be stored on the data storage medium 150 and subsequently loaded into and executed within the computer system 100 using well-known techniques. It will be appreciated by those of skill in the art that, although components of the access policy enforcement system 7 are shown as being stored on the data storage medium 150, they may be stored in any memory of the computer system 100 including the main memory 120.

Specifically, stored on the data storage medium 150 are codes for an environment detector 112, access gate 114, services 116, a table 118 that correlates environment factors to particular mobile states, and a table 119 that correlates mobile states to services offered for that state. It will be appreciated that this is only one example implementation of an access policy enforcement system 7, and other systems are equally acceptable. For instance, the access gate functions could be used to control a hardware firewall that is separate from the computer system 100, which is not depicted in FIG. 11. Additionally some of the codes stored on the data storage medium could be used to control a proxy service-providing device 10 that is separate from the computer system 100.

Embodiments of the invention provide many advantages. One benefit provided is automatic and transparent molding of service policy to the circumstances encountered as a device's operational environment changes. This allows the service policy to be correct for all environments in which the device is operating. As mobile systems become more autonomous, a need for automatic, maximum security preservation is paramount. Another advantage to the invention is that it can be embodied in many different ways, and is not tied to any one specific hardware or software scheme.

Those skilled in the art recognize that the access policy enforcement system 7 can be implemented in many different variations, in software, hardware or firmware in almost any combination. Therefore, although various embodiments are specifically illustrated and described herein, it will be appreciated that modifications and variations of the present invention are covered by the above teachings and within the purview of the appending claims without departing from the spirit and intended scope of the invention.

What is claimed is:

1. An access policy enforcement system, comprising:
a service providing device, including:
an environment state detector for determining a present environment state from a plurality of predetermined environment states in which a mobile computing device that is structured to provide one or more services to a second device is operating, wherein the environment state detector comprises:
an input for receiving one or more state factors; and
a state selector for determining which of the plurality of predetermined environment states is the present environment state based on the one or more state factors received at the input; and
an access gate structured to prohibit or allow access to selected of the one or more services based on the present environment state; and
wherein the present environment state includes a type of network connectivity, a type of network environment, a type of power source, an amount of power remaining, a location, and presence or absence of trusted peers, and
wherein the access gate is structured to provide a first access level to services provided by the mobile computing device when the mobile computing device is operatively coupled to a public access network, to provide a second access level to services provided by the mobile computing device when the mobile computing device is operatively coupled to a wireless network, and to provide a third access level to services provided by the mobile computing device when the mobile computing device is operatively coupled to a wired network.

2. The access policy enforcement system of claim 1 wherein one of the one or more state factors is a speed of a network to which the mobile computing device is coupled.

3. The access policy enforcement system of claim 1 wherein one of the one or more state factors is a trust level between the mobile computing device and the second device.

4. The access policy enforcement system of claim 1 wherein the environment state detector is structured to initiate requests for the one or more state factors.

5. The access policy enforcement system of claim 1 wherein the access gate comprises a firewall.

6. The access policy enforcement system of claim 1 wherein the access gate comprises a service directory.

7. The access policy enforcement system of claim 1, wherein the first access level is more restrictive than the second access level, and the second access level is more restrictive than the third access level.

8. The access policy enforcement system of claim 1, wherein the public access network comprises one of a second wireless network and a second wired network.

9. A mobile computer system for providing services to a second device, the mobile computer system comprising:
a microprocessor structured to execute instructions that cause services to be provided to the second device;
a main memory coupled to the microprocessor and structured to store data and programs for use by the microprocessor;
a communication module coupled to the microprocessor and to the main memory, the communication module structured to transfer data between the mobile computer system and the second device; and
an access policy enforcement system operable on the mobile computer system, the access policy enforcement system including:
an environment state detector for determining a present environment state from a plurality of predetermined environment states in which the mobile computer system is operating, wherein the environment state detector comprises:
an input for receiving one or more environment factors; and
a state selector for determining which of the plurality of predetermined environment states is the present environment state based on the one or more environment factors received at the input, and
an access gate structured to prohibit or allow access to one or more selected services based on the present environment state; and
wherein the present environment state includes a type of network connectivity, a type of network environment, a type of power source, an amount of power remaining, a location, and presence or absence of trusted peers, and
wherein the access gate is structured to provide a first access level to services provided by the mobile computing system when the mobile computing system is operatively coupled to a public access network, to provide a second access level to services provided by the mobile computing system when the mobile computing device is operatively coupled to a wireless network, and to provide a third access level to services provided by the mobile computing system when the mobile computing device is operatively coupled to a wired network.

10. The mobile computer system of claim 9 wherein the environment state detector is structured to initiate requests for the one or more environment factors.

11. The mobile computer system of claim 9 wherein the environment state detector is structured to periodically acquire one or more environment factors.

12. The mobile computer system of claim 9 wherein the access gate comprises a firewall.

13. The mobile computer system of claim 9 wherein the access policy enforcement system is structured to operate in a first virtual machine on the mobile computer system.

14. The mobile computer system of claim 13, further comprising a second virtual machine that includes a second access policy enforcement system.

15. A method for tailoring services, comprising:
a service providing device determining a present operating environment state of a mobile device, wherein determining the present operating environment state of the mobile device comprises:
accepting one or more environmental factors; and
determining the present operating environment state from the one or more environmental factors;
comparing services presently offered by the mobile device to those services appropriate for the present operating environment state; and
prohibiting or allowing access to the services presently offered by the mobile device to a second device such that services offered by the mobile device to the second device are appropriate for the present operating environment state;
providing a first access level to services provided by the mobile device when the mobile device is operatively coupled to a public access network;
providing a second access level to services provided by the mobile device when the mobile device is operatively coupled to a wireless network; and
providing a third access level to services provided by the mobile device when the mobile device is operatively coupled to a wired network.
wherein the present operating environment state includes a type of network connectivity, a type of network environment, a type of power source, an amount of power remaining, a location, and presence or absence of trusted peers.

16. The method of claim 15 wherein determining the present operating environment comprises matching one of a number of predetermined environments to the one or more environmental factors.

17. The method of claim 15 wherein accepting one or more environmental factors comprises polling one or more components of the mobile device for a present state.

18. The method of claim 15 wherein accepting one or more environmental factors comprises performing an interrupt service routine.

19. The method of claim 15 wherein prohibiting or allowing access to the services presently offered by the mobile device comprises changing states of one or more ports in a firewall.

20. An article comprising a data storage medium having associated data that, when accessed, results in a machine:

determining a present operating environment state of a mobile machine, wherein determining the present operating environment state of the mobile machine comprises:

accepting one or more environmental factors; and
    determining the present operating environment state from the one or more environmental factors;

comparing services presently offered by the mobile machine to those services appropriate for the present operating environment state; and prohibiting or allowing access to the services presently offered by the mobile machine to a second device such that services offered by the mobile machine to the second device are appropriate for the present operating environment state;

providing a first access level to services provided by the mobile machine when the mobile machine is operatively coupled to a public access network;

providing a second access level to services provided by the mobile machine when the mobile machine is operatively coupled to a wireless network; and providing a third access level to services provided by the mobile machine when the mobile machine is operatively coupled to a wired network, wherein the present operating environment state includes a type of network connectivity, a type of network environment, a type of power source, an amount of power remaining, a location, and presence or absence of trusted peers.

21. The article of claim 20 wherein prohibiting or allowing access to the services presently offered by the mobile machine comprises changing states of one or more ports in a firewall.

* * * * *

UNITED STATES PATENT AND TRADEMARK OFFICE
CERTIFICATE OF CORRECTION

PATENT NO. : 7,631,089 B2 Page 1 of 1
APPLICATION NO. : 10/335091
DATED : December 8, 2009
INVENTOR(S) : Robert C. Knauerhase et al.

It is certified that error appears in the above-identified patent and that said Letters Patent is hereby corrected as shown below:

Column 14, line 65, the word "network." should read -- network, --.

Signed and Sealed this

Twenty-third Day of February, 2010

David J. Kappos
*Director of the United States Patent and Trademark Office*